(No Model.)
L. C. BAKER.
Post Socket.
No. 239,080. Patented March 22, 1881.
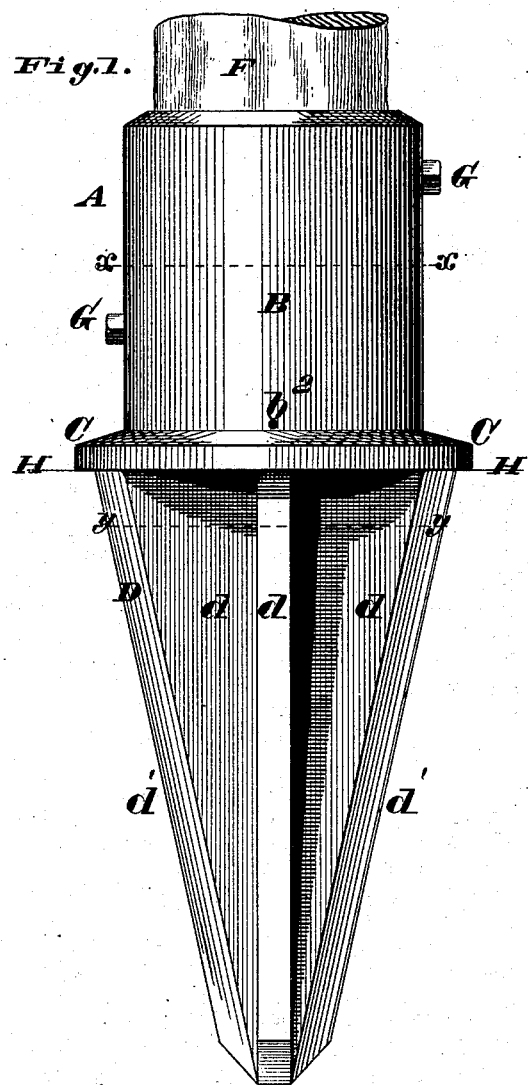
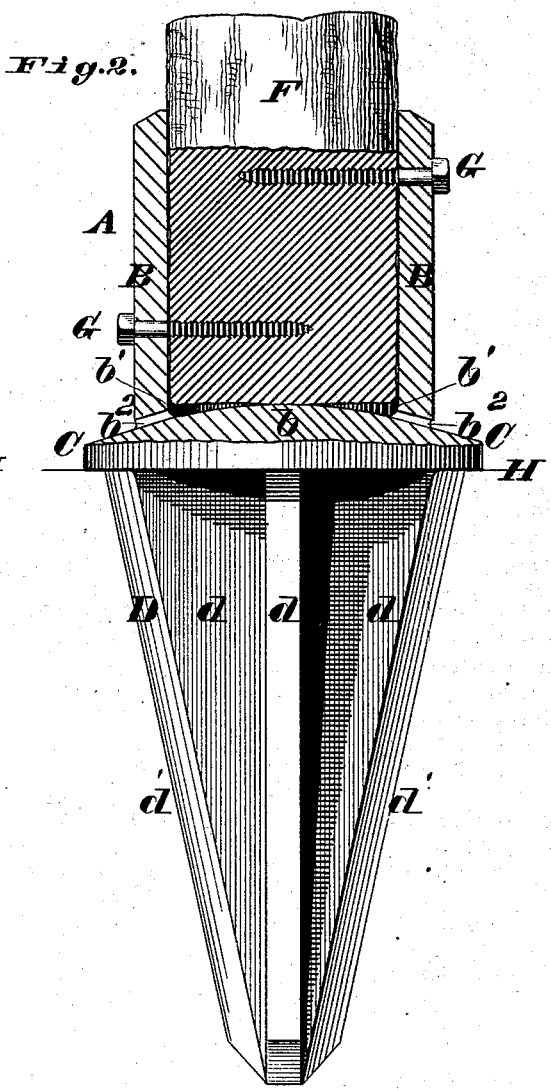
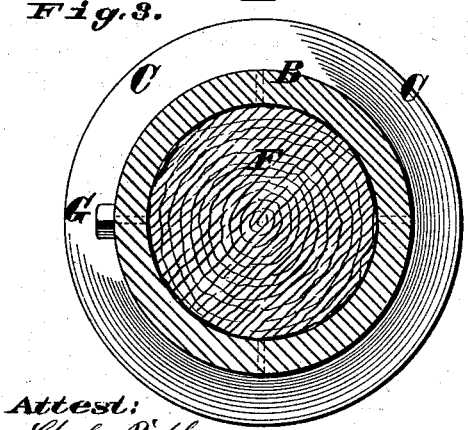
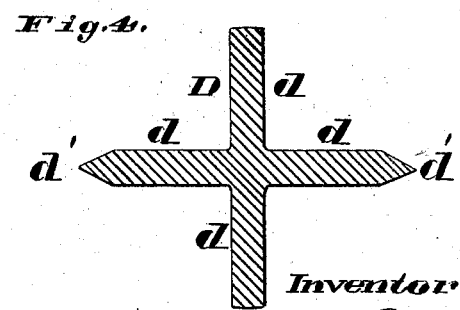
Attest:
Charles Pickles
Saml. S. Boyd
Inventor:
Lara C. Baker
by C. D. Moody.
atty.

UNITED STATES PATENT OFFICE.

LARA C. BAKER, OF ST. LOUIS, MISSOURI.

POST-SOCKET.

SPECIFICATION forming part of Letters Patent No. 239,080, dated March 22, 1881.

Application filed January 25, 1881. (No model.)

*To all whom it may concern:*

Be it known that I, LARA C. BAKER, of St. Louis, Missouri, have made a new and useful Improvement in Post-Sockets, of which the following is a full, clear, and exact description, reference being had to the annexed drawings, making part of this specification, in which—

Figure 1 is a side elevation of the improvement, the lower end of the post being shown in position; Fig. 2, a side elevation, partly in section, of the same parts; Fig. 3, a section taken on $x\ x$, Fig. 1; and Fig. 4, a section taken on the line $y\ y$, Fig. 1.

The same letters denote the same parts.

The present improvement is especially adapted to telegraph-poles, but is useful for holding other forms of posts.

The improvement relates partly to the means for draining the socket and partly to the means for directing the moisture collecting upon and within the socket away from the ground immediately beneath the socket.

Referring to the drawings, A represents the improved device, having the socket B, the flange C, and the foot D. The socket, in horizontal cross-section, may be round, square, or of other desirable shape. The post or pole F, the lower end of which is shown in Figs. 1 and 2, is fitted to the socket, resting upon the bottom and against the side or sides of the socket, and held down therein partly by means of the bolts G G, one of which passes into the socket and post near the bottom and the other near the top of the socket. Additional bolts may be used when desirable. The bottom $b$ of the socket is made convex, forming a gutter, $b'$, in the lowest part of the socket, and wherein the moisture that collects within the socket is received, and thence conveyed away through one or more passages, $b^2\ b^2$, which lead from the gutter $b'$ through the wall of the socket. The flange C is larger in diameter than the socket, and is preferably beveled on top. It serves partly to steady the device, the under side of the flange resting upon the ground, (the surface of which is indicated by the line H,) and partly to direct the moisture which collects upon the outside of the socket, and that which is discharged through the passages $b^2\ b^2$, away from the ground immediately beneath the socket. The foot D of the socket is in the form of two tapering and pointed webs, $d\ d$, arranged at right angles to each other, and having their upper ends as wide, preferably, as the diameter of the socket, and tapering to point at their lower ends.

The entire device, saving the bolts G G, is preferably made in one piece, and is preferably of cast metal.

In use, the device is driven into the ground until the flange C comes to a firm bearing thereon, the operation being facilitated by reason of the tapering and pointed form of the webs $d\ d$, the latter also serving to hold the socket in place against transverse strains.

If desired, the edges of the webs $d\ d$ can be beveled and sharpened, as shown at $d'$.

The gutter $b'$ can be formed in the bottom of the socket B, at any suitable point or points therein, but preferably as shown.

I claim—

1. A post-socket in which the socket B has drain-passages $b^2\ b^2$, arranged as described, and discharging onto a flange, C, which is larger in diameter than the socket, and foot D, substantially as described.

2. A post-socket in which the socket B has a convex closed bottom, $b$, a gutter, $b'$, and drain-passages $b^2\ b^2$, as and for the purpose set forth.

L. C. BAKER.

Witnesses:
CHAS. D. MOODY,
SAML. S. BOYD.